Patented May 28, 1940

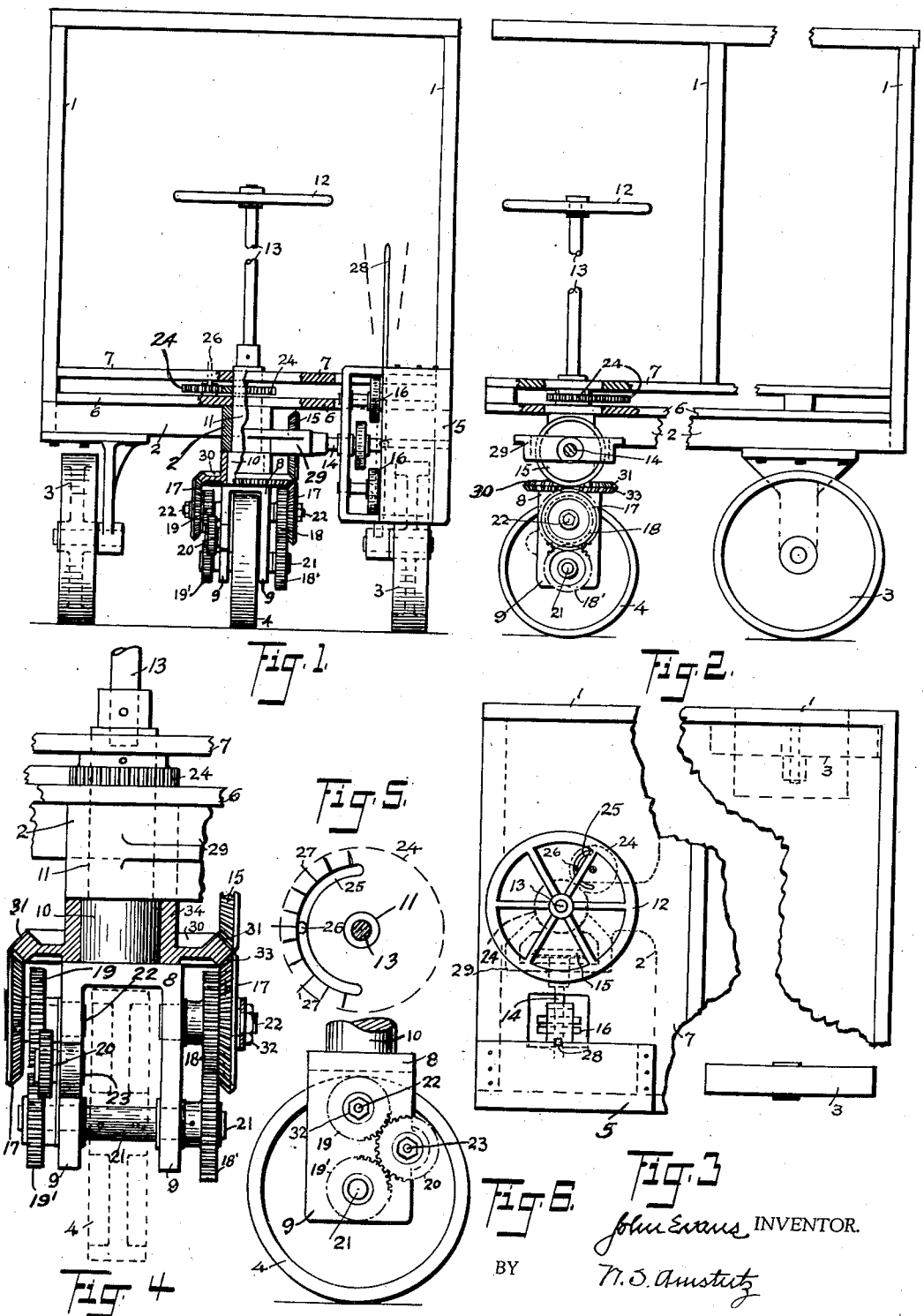

2,202,650

UNITED STATES PATENT OFFICE 2,202,650

UNIVERSALLY MOVABLE TRANSPORT VEHICLE

John Evans, Indiana Harbor, Ind.

Application July 24, 1939, Serial No. 286,113

2 Claims. (Cl. 180—26)

My invention relates to improvements in universally movable transport vehicles, and it more especially consists of the features pointed out in the annexed claims.

The purpose of my invention is to provide a suitable body supported on wheels, tricycle fashion, the two rear wheels being free to rotate independently of each other while supporting the greater portion of the load, and the front or caster wheel serving as the tractor element and adapted to be oriented throughout 180° of the horizontal plane when associated with means for reversing the power from the engine; that in case it is desired to move the caster wheel on a horizontal plane throughout 360°, no provision need be provided for reversing the engine, a simple clutch being interposed between the engine, and the means for applying power to the tractor wheel; that provides additionally universal flexibility in directing operations so that the vehicle can be used for loading and unloading heavy or other merchandise through the narrow doors and into restricted areas of conventional freight cars, a facility that has not been provided hitherto.

With these and other ends in view I illustrate in the accompanying drawing such instances of adaptation as will disclose the broad features of the invention without limiting myself to the specific details shown thereon and described herein.

Fig. 1 is a front elevation with parts in section.

Fig. 2 is an elevation of the left hand side of the vehicle, the center portion being broken away, also showing the two related driving gears on this side of the caster wheel yoke.

Fig. 3 is a top plan view of Fig. 2, also showing portions broken away.

Fig. 4 is an enlargement of the caster wheel yoke.

Fig. 5 is a top plan view of the limiting means and the associated graduations indicating the position of the caster wheel beneath the floor of the vehicle.

Fig. 6 is a detached elevation of the left hand side of the caster wheel, and its four driving gears.

In the actual use of my invention, I may employ whatever alternatives or equivalents of structure that the exigencies of varying conditions may demand without departing from the broad scope of the invention.

Any desired form of body I may be used. The details of its structure will depend upon the kind of material that is to be handled, for instance, boxes, etc., would be disposed of in the usual manner for loading articles of this kind.

In the case of heavy steel sheets, etc., which, because of their width and length must be handled, flatwise, not edgewise, the floor of the body would be left open between the rear wheels, and any desired form of crane facility (not shown) for lifting groups of such sheets a short distance above the floor would be provided.

The entire purpose of my invention is to provide a vehicle for transporting purposes that can be manoeuvered within the smallest possible area. It is immaterial, from this broad standpoint, whether my universal drive is applied to one or another form of cooperating body.

The body may have a sufficiently strong and heavy frame 2. Separately rotatable rear wheels 3 are provided. These wheels are independently supported by any kind of suitable brackets attached to the under side of the body. At the front end of the body, there is a third wheel 4 which is supported in a caster wheel yoke 8. Any desired form of engine 5 may be used. There is a bottom floor 6 and directly above this with a space between there is a top floor 7.

The floors 6 and 7 and the driving engine may be mounted on the top floor 7 from which it is suspended as shown in Figs. 1 and 3. The housing for gears 16 projects into an opening formed in floors 6 and 7. Any other form of power drive may be used, either electric or hydraulic. In case the latter is used as a substitute, the control taught in my Patent #2,182,982 of December 12, 1939, may be employed.

The caster wheel yoke 8 with the driving means 15 and 30 supported thereon is the principal feature of my device. It has side members 9 between which the third or front wheel 4 is positioned on an axle 21, which passes through the side members 9 near their lower end. The side members are joined at the top to form a cylindrical extension of different diameters. The larger diameter extension 10 is for the hub 34 of the loosely mounted driving bevel gear 30. Above this extension 10 a smaller diameter extension 11 is formed. This has bearing in the front central projection of the frame 2. At the extreme upper end, a hand wheel 12 is attached by means of a stem 13 to the smaller diameter extension 11. The gear 30 is journaled on the extension 10 of the yoke 8 for free movement thereon.

The main driving bevel gear 30 rotating on the portion 10 of the yoke 8 has a double face. The upper bevel 31 receives the intermeshing teeth of the bevel gear 15 on the main drive shaft 14. The under face bevel 33 of this main driving gear meshes with a pair of beveled gears 17, one on each side of the yoke 8.

The direction of rotation of the duplicate intermeshing bevel gears 17 may be changed as a whole in any conventional manner. This may be accomplished by means of shift gears 16, cooperating with the engine 5 and a fixed gear on the main drive shaft 14, through the use of any desired form of reversing lever 28. On the right hand side member 9 of the yoke 8 and similarly on the left hand side member 9, stationary shafts 60

22 project. Facing the machine, on the right hand side of the yoke a spur gear 18, Figs. 1 and 2, is secured to its adjacent bevel gear 17. It meshes with a similar spur gear 18' on the axle 21. These spur gears 18 and 18' are of the same diameter. On the left side of the yoke there are smaller diameter spur gears 19 and 19'. The gear 19 is attached to its adjacent bevel gear 17 on the left hand stationary shaft 22, and its companion, a non-meshing gear 19', is on the left hand end of the axle 21. The direction of rotation of the spur gears 19 and 19' is changed by an idler gear 20 of the same diameter meshing with both of the gears 19 and 19'. This idler gear is free to rotate on the stationary shaft 23. The gears 17, 18, 19 and 20 are retained on their respective stationary shaft by nuts 32 or otherwise.

A side extension 29 of the main frame 2 forms a support for the main driving shaft 14, and in an opening of this extension, space is provided for the beveled gear 15.

Between the upper floor 7 and the lower floor 6, two intermeshing position indicating gears 24 are placed. One of these gears is attached to the upper extension of the caster wheel yoke. Its intermeshing gear is mounted on a conventional pin between the floors 6 and 7 and it has a limiting pin 26 which projects through a slot 25 in the upper floor, and when used serves to limit the shifting of the caster wheel throughout a horizontal angle of 180°. Adjacent the slot 25, graduation marks 27 may be made on the floor to indicate to the operator the position the tractor wheel is in, so that he will know whether it is standing for straight ahead movement, movement to the right or movement to the left and the extent of the right or left changes.

Should the limiting stop 26 be eliminated, and a slot similar to 25 be formed so that its total length through proper gear ratios (not shown) would represent a 360° horizontal movement of the caster wheel, then an indicating pin similar to the stop pin 26 would pass the graduations marked adjacent the slot. These marks will indicate the forward, rear, forward right, forward left, rear right, and rear left, positions of the tractor wheel 4.

The interrelated direction of rotation of the group of gears on the right side of the caster wheel yoke and the group on the left hand side of the yoke is such that the gears on each end of the caster wheel axle 21 rotate in the same direction. This similarity of direction is brought about through the use of the idler gear 20.

By driving the axle 21 at both ends a uniform effect is produced and the stresses are more evenly divided than if the axle were driven from one end only.

From the description it will be apparent that the vehicle can be manoeuvered with the greatest facility, within restricted areas forward or backward, with modifications to the right or left as the confined space may demand.

In case it is desired to relieve the operator of the strain of turning the steering wheel it may be operated by hydraulic or any other form of drive.

In the operation of my device it is important that power can be applied to the caster wheel 4 regardless of the position it may be turned into by the operator, that is it will roll the entire body straight. If reversed it will move the entire vehicle and any load straight rearward. When power is applied to roll the wheel for forward movement, a turn of the wheel 90° to the right will move the front end of the body sidewise to the right. Now, if the wheel is turned 90° to the left the front end of the body will move to the left. Any adjustment between 0° and 90° will change the body position accordingly, for instance a change of 45° in the position of the wheel will translate one-half of the movement forward and one-half to the right resulting in a change of 45° to the right or left according to the position the wheel is in. If the wheel rotation is reversed the resultant movements will also be reversed.

By reason of this facility I am able to move a loaded vehicle through narrow places on exceedingly short turns and thus secure a speed and safety in handling the heaviest merchandise which cannot be attained with existing means.

The application of power from shaft 14 through gears 15 and 30 to gears 17 is entirely independent of the position of the caster wheel, that is, power will be applied to the caster wheel regardless of the position it is put in by the driver through the manipulation of the hand-wheel 12, and the shift lever 28 because the gears 17 will roll freely on the underside of the double bevel gear 30. The free pulling action of the gears 17 is accomplished because they engage the gear 30 on diametrically opposite sides of its center. During the actual time of shifting the power for the caster wheel may be disconnected by the shift lever 28 and the gears 17 will roll freely beneath the bevel gear 30.

What I claim is:

1. A power driven caster wheel for a universally movable vehicle which comprises a U-shaped member, a vertically extending pivotal projection of the member, an axle at the lower end of the side projections of the said member, a driving wheel secured to the axle, a bevel driving gear rotatable around the vertical extension, a body frame to support the extension, means for rotating the bevel driving gear, a pair of bevel gears meshing with the underside of the driving gear on opposite sides of its center, and intermeshing spur gears between the latter bevel gears and the wheel axle adapted to translate opposite directions of rotation of the pair of bevel gears into the same direction of rotation of the wheel axle so as to apply power to both sides of the caster wheel independently of any changes in its orientation.

2. A caster wheel for a universally movable vehicle which comprises a U-shaped yoke member for straddling the wheel, a vertically pivoting extension of said member, a driving gear rotatable on such extension, an axle at the bottom end of the sides of the U-shaped member, gear connections at one end of the axle to the underside of the driving gear, gear connections at the other end of the axle to the underside of the driving gear meshing therewith at a point diametrically opposite the point of engagement of the gear connections to the other end of the axle, an idler gear associated with the latter group of gears for changing the difference in direction of rotation of the bevel gears with the driving gear into the same direction at the ends of the wheel axle, a traction wheel on the axle, a frame supporting the upper end of the caster wheel yoke, a body attached to the frame, a pair of independent supporting wheels under the body, a source of power on the body, and means for applying such power as desired to the rotation of the tractor wheel.

JOHN EVANS.